2,860,123

ALKENYL SULFURIC ACID AND VINYL-PYRIDINE RUBBER COMPOUNDED THEREWITH

Rufus V. Jones, Bartlesville, Okla., assignor to Phillips Petroleum Company, a corporation of Delaware No Drawing. Application February 25, 1954
Serial No. 412,643

16 Claims. (Cl. 260—79.5)

This application is a continuation-in-part of my applications, Serial Nos. 123,795, 123,796, 123,797, filed October 26, 1949, the first and last applications are now abandoned.

This invention relates to certain novel sulfur-containing compounds and to methods for preparing the same. In one of its aspects the invention relates to an alpha-chloroalkyl chlorosulfate and to a method for preparing the same. In another of its aspects the invention relates to an alkene sulfuric acid and to a method for preparing the same. Further, another aspect of the invention relates to the preparation of an alkene sulfuric acid from an alpha-chloroalkyl chlorosulfate. Also the invention relates to certain novel compounds which are obtained by a reaction between an alkene sulfuric acid and a barium salt, for example barium chloride. In a further aspect still the invention relates to barium double salts of alkene sulfuric acids. Still in a further aspect the invention relates to novel polymers, of an alkene sulfuric acid, having certain desirable properties and utilities. In another aspect of the invention it relates to a novel moldable polymer of an alkene sulfuric acid and to the molded articles obtained therewith. In still a further aspect the invention is concerned with a useful solution of a polymer of an alkene sulfuric acid, for example, a film-forming solution useful for coating of materials. In a further aspect still, the invention relates to a solution of a relatively low molecular weight solid polymer of an alkene sulfuric acid useful as a polymeric emulsifier, for example, in acid-side polymerization to form resinous masses. Other aspects of the invention are evident upon a study of this disclosure and the appended claims.

According to the invention it has been found that an alpha-chloroalkyl chlorosulfate can be prepared by treating a 1,1-dichloroalkane with sulfur trioxide. Further according to the invention it has been found that an alpha-chloroalkyl chlorosulfate can be converted to an alkene sulfuric acid by contacting it with water. Still, further according to the invention it has been found that a barium alkene-sulfate acid sulfate can be prepared by causing to interact an alkene sulfuric acid of this invention with a barium salt, for example, barium chloride.

Also, according to the invention, it has been found that an alkene sulfuric acid of the invention can be caused to polymerize to yield a solid, moldable polymer, soluble in, say, carbon tetrachloride and useful in such solution as a coating material, and a relatively low molecular weight polymer useful as a polymeric emulsifier. Still further according to the invention it has been found that an alkene sulfuric acid of the invention is useful as an additive for a pyridine rubber, for example, a vinylpyridine-butadiene copolymer rubber, to increase its tensile strength upon heat treatment. Further still it has been found that a relatively low molecular weight polymer, which can be extracted with alkali from the solid moldable polymer, is useful as a detergent or as an emulsifier, for example in emulsion polymerization systems.

An object of this invention is to provide novel sulfur containing compounds.

Another object of this invention is to provide a method for the preparation of novel sulfur containing compounds.

Still another object of the invention is to provide an alpha-chloroalkyl chlorosulfate.

Still a further object of the invention is to provide a method for the preparation of an alpha-chloroalkyl chlorosulfate.

A further object of the invention is to provide an alkene sulfuric acid.

A still further object of the invention is to provide a method for the preparation of an alkene sulfuric acid.

A further object, still, is to provide a barium salt of an alkene sulfuric acid.

Further, still, another object of the invention is to provide a method for the preparation of a barium salt of an alkene sulfuric acid.

Another object of this invention is to provide novel polymers which are moldable and can be used as coating material.

Further, an object of this invention is the provision of a novel additive for a pyridine rubber and a rubber product so produced.

Yet another object of this invention is to provide a novel emulsifier material useful in acid-side polymerization to produce resinous masses.

Other objects are apparent from this specification and claims.

According to this invention there has been provided an alpha-chloroalkyl chlorosulfate and a method for preparing the same which comprises contacting a substantially anhydrous 1,1-dichloroalkane with sulfur trioxide.

Also, according to this invention there is provided an alkene sulfuric acid and a method for its preparation which comprises hydrolyzing an alpha-chloroalkyl chlorosulfate with water.

Also, according to the invention there is provided a novel barium compound and a method for its preparation which comprises the steps of causing an alkene sulfuric acid to interact with a barium salt, for example, barium chloride.

Also, according to this invention, a polymer of an alkene sulfuric acid of this invention is prepared by heating such an alkene sulfuric acid, preferably dissolved in water, for a time sufficient to form said polymer.

Further, according to this invention a solid polymer of an alkene sulfuric acid is prepared by heating such an acid for a time sufficient to obtain said polymer.

Also, according to this invention a coating of a solid polymer of an alkene sulfuric acid is laid down upon a material to be coated by dissolving said polymer in a solvent therefor, applying the solution to said material and then evaporating said solvent from said solution.

Further, according to the invention the tensile strength of a pyridine rubber, for example, a butadiene-vinyl-pyridine rubber, is increased, and its other properties improved, by compounding said rubber with an alkene sulfuric acid of the invention and then subjecting the compounded mass, thus obtained, to heat treatment.

Also, according to the invention there is provided a method for the emulsification of a heterogeneous system which comprises adding to such a system a low molecular weight polymer of an alkene sulfuric acid of the invention obtained by extraction with a suitable solvent such as aqueous alkali metal hydroxide or methanol of a solid polymer of an alkene sulfuric acid of the invention.

The reaction between the dichloroalkane and the sulfur trioxide to form the alpha-chloroalkyl chlorosulfate is effected at a low or at an ordinary temperature, preferably below, say, 25° C., still more preferably in the range minus 20° C. to 20° C. A range of minus 5° C. to 5° C.

is quite satisfactory. The sulfur trioxide employed can be either gaseous or liquid and ordinarily is added in a mol ratio to the dichloroalkane, say, dichloroethane, of from 0.5:1 to 5.0:1, preferably 1:1 to 2:1. The reaction is self-starting, the sulfur trioxide is passed into the liquid dichloroalkane contained in a suitable vessel which can be cooled by placing it in crushed ice. Care is to be taken, when passing the sulfur trioxide into the dichloroalkane, that the temperature does not rise excessively. The reaction will proceed smoothly. The reaction can be conducted at atmospheric pressure and, therefore, no pressure vessel is required. The reaction of the alpha-chloroalkyl chlorosulfate with water, set out below, is strongly exothermic, and therefore, this should be carried out under carefully controlled conditions. The alpha-chloroalkyl chlorosulfate can be separated from the reaction mass by pouring said mass onto crushed ice to obtain an oily layer containing the same as set forth more fully herein. The alpha-chloroalkyl chlorosulfate layer need not be separated from the water when the alkene sulfuric acid is desired to be prepared. Thus, the reaction mass of water, ice and oily layer can be heated to a temperature in the range of from about 10° C. to about 100° C., preferably 50° C. to 80° C., say, 75° C. to cause formation of the alkene sulfuric acid which can be obtained from the reaction mass by extraction with a solvent such as diethyl ether or any suitable means. Polymerization, which is also an exothermic reaction, occurs at higher temperatures in the broad range set forth and for this reason for highest yields of the monomeric acid it is now preferred to employ lower temperatures in said range.

To form a barium salt of the invention the corresponding alkene sulfuric acid and sulfuric acid in a 1:1 mol ratio are first dissolved in water. Then the acid solution is treated with an equimolar quantity of aqueous barium chloride. The desired barium salt crystallizes and can be recrystallized from water to provide the pure salt. The barium salt of the invention can also be prepared without separating the alkene sulfuric acid from the solution in which it is formed. Such solutions which will also contain sulfuric acid may be treated directly with barium chloride to yield the desired barium salt.

The preparation of the polymers of the alkene sulfuric acids of this invention can be accomplished quite readily in water solution. Thus, the acid, dissolved in water, is heated until polymerization is initiated. The temperature at which polymerization will begin can be determined by mere routine test. Usually the temperature will be above room temperature, in water solution, and will be at least about 175 to 200° F. (80° C.–90° C.). Nearer the boiling temperature of water, say, 200° F. polymerization will take place rapidly. Vinyl sulfuric acid, for example, was polymerized in water solution at an initial temperature of about 175° F. and with rise of the temperature the rate of polymerization increased until at or near the boiling temperature of water polymerization proceeded quite rapidly.

In the two-step preparation of the alkene sulfuric acid of this invention there is first formed, as stated, an alpha-chloroalkyl chlorosulfate by reaction of anhydrous sulfur trioxide and an anhydrous 1,1-dichloroalkane, as illustrated by the following equation

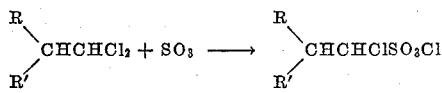

wherein R and R' can be hydrogen or an alkyl group, R and R' can be identical or different and wherein the carbon atoms in R and R' total not more than twenty. For example, the alkyl group or groups may be selected from ethyl, n-propyl, isopropyl, isobutyl, tertiary butyl, etc. groups. Also, the 1,1-dichloroalkanes used in the process of the invention can be represented by the formula

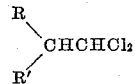

wherein R and R' are as before stated herein. Therefore, the formation of the alkene sulfuric acids prepared according to the invention can be represented by the equation

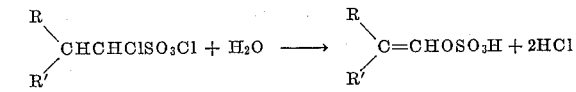

wherein R and R' are as before stated herein.

The alkene sulfuric acids of this invention are characterized at least by an alpha double bond, as shown.

The reactions of the alkene sulfuric acids of this invention with sulfuric acid and a barium salt can be represented by the equation

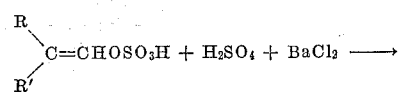

wherein R and R' are as before stated herein.

The polymers of the alkene sulfuric acids of my invention have a structural formula which can be represented as follows:

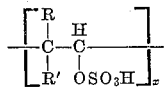

wherein R and R' are as defined above and wherein $x$ is a whole number which can be in the range of 5 to 50 and more generally in the range of 2 to 500 or even higher. The formula for polyvinyl sulfuric acid can be represented as follows:

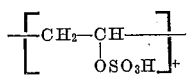

where $x$ is as defined above.

By hydrolysis of this acidic polymer a polymer containing hydroxyl groups can be obtained as represented by the following formula:

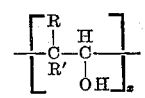

wherein R, R' and $x$ are as defined above. For example when the polymer of vinyl sulfuric acid is hydrolyzed polyvinyl alcohol is obtained. This material has many uses in the resin and plastic fields as known to those skilled in the art, i. e. as a component in protective coatings, as a film-forming material, in the preparation of hydrocarbon-resistant products, such as tubing, and the like.

The vinyl sulfuric acid can also be polymerized in the presence of ultraviolet light. At room temperature the vinyl sulfuric acid polymerizes to a solid, water-insoluble polymer, but of course the rate is considerably lower than it is at the higher temperature mentioned above. Certain catalysts have a promoting effect on this polymerization reaction.

The following examples are illustrative of the several aspects of the invention.

EXAMPLE I

One hundred one grams of 1,1-dichloroethane was placed in a flask cooled by an ice bath. To this material was slowly added 157 grams of sulfur trioxide. The reaction mixture was poured onto 1000 grams of crushed ice, considerable heat being evolved. Upon standing, an oily layer separated. This layer, comprising 44 grams of crude alpha-chloroethyl chlorosulfate, was removed, dissolved in ether, washed with ice water until free from sulfate ions and dried over $P_2O_5$ under reduced pressure. Analysis of the product and calculated values for $C_2H_4Cl_2O_3S$ ($CH_3CHClSO_3Cl$) were

*Table I*

|  | Calculated | Found |
| --- | --- | --- |
| Chlorine (percent) | 39.61 | 39.24 |
| Sulfur (percent) | 17.91 | 17.88 |
| Neutral Equivalent |  | 67.47 |

The alpha-chloroalkyl chlorosulfates of the present invention are useful in the preparation of the alkene sulfuric acids which, of course, possess the several utilities which are herein set forth. By treatment with alkali the chloroethyl chlorosulfate is converted to the corresponding salt of methionic acid, which by treatment with acid yields methionic acid.

EXAMPLE II

After removal of the oily layer as described in Example I, the aqueous layer was extracted with ether. The extract so obtained was distilled to remove ether, leaving ethylene sulfuric acid, an acrid smelling liquid, a portion of which was converted into a benzyl-isothiourea derivative. This derivative had a melting point of 320°–322° F. (160°–161.1° C.). Analysis of this derivative and the corresponding calculated values for the compound $C_{10}H_{14}N_2O_4S_2$ were:

*Table II*

|  | Calculated (Percent) | Found (Percent) |
| --- | --- | --- |
| Sulfur | 22.10 | 22.07 |
| Carbon | 40.71 | 41.36 |
| Hydrogen | 4.88 | 4.86 |

The alkene sulfuric acids and particularly the vinyl sulfuric acid have the following uses: They can be homopolymerized to provide resinous high molecular weight polymers containing acidic groups. These polymers can be treated to replace the acidic groups with hydroxyl groups by hydrolysis. They can be copolymerized, according to known methods, with other polymerizable monomeric materials such as butadiene, styrene, acrylonitrile, ethyl acrylate, and vinyl chloride to produce resinous or rubber-like copolymers. These copolymers will contain an acidic group which if desired can be replaced by a hydroxyl group by hydrolysis. Thus, a novel method of producing polymers containing hydroxyl groups is also provided as a feature of this invention. By the reaction of the acid with an alcohol a mixed ether containing an unsaturated group is obtained. These unsaturated ethers can be polymerized as is shown in the art: See United States Patents Nos. 2,104,000, 2,104,001, 2,104,002, 2,061,934 and 2,016,490. The unsaturated ethers also will react with potassium cyanide to form the corresponding unsaturated nitriles. For example, vinyl sulfuric acid will react with KCN to yield acrylonitrile. The reaction with a barium salt and sulfuric acid has been shown herein.

EXAMPLE III

The entire water washing, extractions, etc., from the run of Example I, other than the portion used in the tests of Example II, were combined and concentrated. Sulfate ions were removed by treatment with barium chloride. After filtration to remove barium sulfate, a water soluble barium salt crystallized from the hot filtrate. This material was recrystallized from water to provide needle shaped crystals. Analysis of the product and the corresponding values calculated for barium ethylidyne acid sulfate ($CH_2$=$CHOSO_3BaOSO_3H$) were:

*Table III*

|  | Calculated (Percent) | Found (Percent) |
| --- | --- | --- |
| Carbon | 6.72 | 6.45 |
| Hydrogen | 1.13 | 1.64 |
| Barium | 38.42 | 37.84 |
| Sulfur | 17.93 | 17.66 |

EXAMPLE IV

A sample of the product of Example III (barium ethylidyne acid sulfate) was dissolved in water and treated with bromine water until no more bromine was taken up. The solution was allowed to stand for two hours after which it was heated to expel unreacted bromine and concentrate the solution. Isopropyl alcohol was added to this concentrate and upon cooling, beautiful glistening crystals separated. Analysis of this crystalline product and the corresponding calculated values for the compound $C_2H_3BaBrO_8S_2$ ($CH_2$=$CBrOSO_3BaOSO_3H$) were:

*Table IV*

|  | Calculated (Percent) | Found (Percent) |
| --- | --- | --- |
| Barium | 31.47 | 30.93 |
| Bromine | 18.31 | 18.3 |
| Sulfur | 14.69 | 14.50 |

The barium double salt of Example IV has been used to decolorize potassium permanganate solutions and is useful as an analytical reagent, i. e., as a reducing agent for standardizing potassium permanganate solutions which are employed in analytical and other chemical reactions. Also the salt is useful to remove excess halogen from bleaching solutions. The salt is also useful to intensify the coloring of Congo red.

EXAMPLE V

To 103 grams of 1,1-dichloroethane was slowly added 160 grams of sulfur trioxide, the flask being immersed in an ice bath during the addition. The mixture was poured over crushed ice and the oily layer which formed separated. Forty grams of this crude oily product was added to 100 grams of cold 30 percent potassium hydroxide solution. The alkaline solution was made acid with hydrochloric acid, and treated with barium chloride, and filtered while hot. From the solution a white crystalline compound separated, which proved to be the barium salt of methionic acid. The formula of methionic acid is given at page 463 of Hackh's Chemical Dictionary, copyright 1929, as $CH_2(SO_3H)_2$. Analysis of this compound and the corresponding calculated values for the compound $CH_2BaO_6S_2$ ($CH_2(SO_3)_2Ba$) were:

*Table V*

|  | Calculated (Percent) | Found (Percent) |
| --- | --- | --- |
| Carbon | 3.86 | 3.87 |
| Hydrogen | 0.65 | 0.90 |
| Sulfur | 20.58 | 20.76 |
| Barium | 44.09 | 43.61 |

Methionic acid can be condensed with hexadecene to form high molecular weight sulfuric acids of use in the textile industry.

EXAMPLE VI 250 grams of ethylidene chloride (1,1-dichloroethane) was charged to a 3-necked flask fitted with a Dry Ice-acetone cooled condenser attached to a sulfuric acid trap, a stirrer, thermometer, and dropping funnel. To the ethylidene chloride was added dropwise with stirring, 237.5 grams of sulfur trioxide (Sulfan-B), the mixture being maintained at a temperature below 30° F. (—1.1° C.) at all times by suitable cooling means. The addition of sulfur trioxide required a total of about 30 minutes at which time the reaction mixture was a light colored liquid. Stirring was continued at low temperature for one hour to ensure complete reaction.

Contents of the flask was poured over about two liters of shaved ice to remove unreacted sulfur trioxide and effect some hydrolysis. Considerable heat was evolved as evidenced by melting of most of the ice. The hydrolysis mixture formed two phases, an oil layer and a supernatant aqueous layer.

The oil layer, identified in a previous series of experiments as $CH_3CHClSO_3Cl$ was recovered and washed with ice water until essentially free of sulfate ion. It was then dissolved in cold ether and again washed with ice water. The washed ether solution was placed in an equal volume of distilled water and the temperature of the two-phase mass thus obtained allowed to rise. At or somewhat below room temperature, hydrolysis of the alpha-chloroalkane chlorosulfate proceeded with considerable evolution of heat. Cooling of the flask was effected, thus preventing overheating during the evolution of said heat. The hydrolysis product, which was vinyl sulfuric acid, dissolved in the water as said product was formed. The temperature was elevated to the boiling point and boiling continued for some time without external heating, indicating that further reaction was taking place. A considerable amount of polymer had formed in the flask at the end of this time. Samples of the above-mentioned aqueous solution, formed by solution of the vinyl sulfuric acid in the water phase as it was formed, were removed and found to be very strongly acid in reaction. When added to a solution of potassium permanganate the acid removed its color.

The aqueous solution containing the polymer was cooled and extracted six times with ether. The combined extracts were placed in an evaporating dish and the ether evaporated by a stream of air directed on the surface of the liquid. The residual product, after removal of the ether consisted of a solid polymeric material and an oily liquid. The liquid was removed by decantation. It was found that the solid product was insoluble in methyl alcohol and aqueous sodium hydroxide (pH 10). The oily liquid was soluble in both of these materials.

The oily phase decanted from the solid polymer was principally unpolymerized acid containing as a minor ingredient, low molecular weight polymers of vinyl sulfuric acid.

Infrared analysis of a portion of the alkali-washed solid polymer indicated the presence of the following groups: OH, CH, and $RSO_4H$.

The intrinsic viscosity of this polymer was determined in carbon tetrachloride at 30° C., and was found to be 0.03. The molecular weight of this polymer was calculated to be in the range 1000 to 5000.

EXAMPLE VII

A portion of the solid polymer was warmed to 150° F. (65.4° C.) in water, formed into a shape and cooled to room temperature to provide a solid specimen. This test was repeated, heating the polymer on a hot plate.

The solid material is insoluble in dilute alkali, methanol, and water and soluble in carbon tetrachloride, carbon disulfide, benzene, and ether.

EXAMPLE VIII

A film was cast on a glass plate, using a solution of the polymer in carbon tetrachloride. This film adhered tenaciously to the glass plate, had a Sward hardness of 46, pencil hardness of 5, and showed a high gloss.

EXAMPLE IX

A portion of the oily liquid, obtained in Example VI, principally vinyl sulfuric acid, was decanted from the solid product and was tested as an additive for an 88–12 butadiene-vinyl pyridine rubber. To 100 parts of the rubber was added 20 parts of the liquid acid product dropwise on a warm mill (100° F., 37.8° C.), requiring about 15 minutes for the addition. The rubber was then removed from the mill, placed in a slab mold and heated for about 5 minutes at 307° F. (152.8° C.) and allowed to cool. Test data on this rubber and an untreated control of the same rubber are as follows:

|  | Treated | Control |
|---|---|---|
| Tensile, p. s. i. | 461 | 88.5 |
| Elongation, percent | 525 | 1,040 |
| Shore Hardness [$A_2$] | 46–49 | 26 |

The reaction of the vinyl sulfuric acid in the foregoing rubber additive test was unique in the sense that, although an acid salt of the pyridine nucleus was formed, it is different from those heretofore observed. Thus, while with mineral acid (i. e., hydrochloric or sulfuric acid) agents the rubber sets up on the mill to a hard, unprocessible mass, in the foregoing test the rubber was easily milled and later satisfactorily molded to obtain a useful product. Also, had an organic quaternizing agent (i. e., an alkyl halide) been used, its full effectiveness would not have been realized, ordinarily, for at least several hours.

A specimen of the rubber containing the vinyl sulfuric acid treating agent was heated, without significant change in its properties, in a mold at 307° F. (152.8° C.) for five hours. Test data on the heated sample were: tensile, 337 p. s. i.; elongation, 597.

EXAMPLE X

Low molecular weight polymer, obtained by extracting a portion of the solid polymer by washing with alkali, was studied for surface tension properties. The aqueous alkali solution (pH 10) was found to contain 15 percent solids and from it solutions containing 7.5 and 3.75 percent solids were prepared. Surface tension data on these solutions were as follows:

|  | Surface [1] Tension |
|---|---|
| Percent Solids: |  |
| 15.00 | 45.6 |
| 7.50 | 47.3 |
| 3.75 | 66.0 |
| Controls: |  |
| Water | 72.2 |
| NaOH Solution | } 72.2 |
| pH 10 |  |

[1] All values taken at room temperature (23° C.).

These data show that this material is effective as a polymeric emulsifier, and, therefore, useful for many applications particularly in preparation of resinous polymers.

EXAMPLE XI

A sample of vinyl sulfuric acid in aqueous solution was exposed to ultraviolet radiation at 158° F. for eight hours at which time polymer formation was evident. Exposure was continued for about 100 hours at which time extensive polymerization had occurred.

EXAMPLE XII

A water solution of vinyl sulfuric acid similar to that of Example XI except that Maprofix (sodium lauryl sulfate) was added in the proportion of two grams per 100 ml. acid solution was heated in the absence of ultraviolet light at 175° F. on a water bath. Polymerization of the vinyl sulfuric acid had occurred at the end of eight hours.

The foregoing examples, as stated, are illustrative of the several aspects of the invention. Other chlorosulfates and corresponding sulfuric acids and barium salts are intended to be included. For example, alpha-chloropropane chlorosulfate, alpha-chlorobutane chlorosulfate and alpha-chloro-2-methylpropane chlorosulfate, etc. are within the scope of this invention. Also, for example, propene sulfuric acid, 1-butene sulfuric acid and 2-methylpropene sulfuric acid, etc., are included within the scope of the invention. Furthermore, the barium salts of said sulfuric acids are also included within the scope of the invention. The polymers and other products resulting from the alkene sulfuric acids of this invention, which correspond to those set forth and described herein, are also intended to be included within the scope of the invention as set forth and claimed.

Reasonable variation and modification are possible within the scope of the foregoing disclosure and the appended claims to the invention the essence of which is that a novel alpha-chloroalkyl chlorosulfate, alkene sulfuric acid, barium compound of said acid, a polymer of said acid, a rubber composition made using said acid, a method of polymerization employing such an acid, and a hydroxyl-group-containing copolymer of such an acid with other monomeric materials have been set forth and described as well as that methods for the preparation of the described materials have been set forth and described.

I claim:

1. A method for the preparation of an alkene sulfuric acid, having the formula

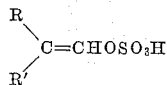

wherein R and R' are selected from hydrogen and an alkyl group and wherein the carbon atoms in R and R' total not more than twenty whenever an alkyl group is present; in which a substantially anhydrous 1,1-dichloroalkane, having the formula

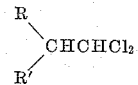

wherein R and R' are as before stated herein; is treated with anhydrous sulfur trioxide to form an alpha-chloroalkyl chlorosulfate, having the formula

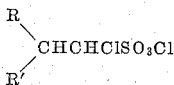

wherein R and R' are as before stated herein; and then the chlorosulfate is treated with water to form said acid.

2. A method for the preparation of an alkene sulfuric acid, having the formula

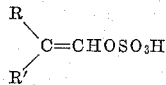

wherein R and R' are selected from hydrogen and an alkyl group and wherein the carbon atoms in R and R' total not more than twenty; in which an alpha-chloroalkyl chlorosulfate, having the formula

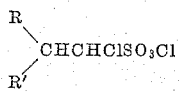

wherein R and R' are as before stated herein is treated with water to form said acid.

3. A method for the preparation of ethylene sulfuric acid which comprises treating 1,1-dichloroethane with sulfur trioxide at about 0° C. and then treating the reaction mass with water at about 75° C. to form said acid.

4. A method for the preparation of ethylene sulfuric acid which comprises treating alpha-chloroethane chlorosulfate with water.

5. Ethylene sulfuric acid having the formula

6. A method for the preparation of an alpha-chloroalkyl chlorosulfate having the formula

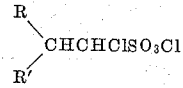

wherein R and R' are selected from hydrogen and an alkyl group and wherein the carbon atoms in R and R' total not more than 20 whenever an alkyl group is present which comprises treating a substantially anhydrous 1,1-dichloroalkane, having the formula

wherein R and R' are as before stated herein, with sulfur trioxide at a low temperature to form said alpha-chloroalkyl chlorosulfate.

7. Alpha-chloroalkyl chlorosulfate having not more than 20 carbons in the alkyl.

8. Alpha-chloroethane chlorosulfate.

9. A method for the preparation of alpha-chloroethane chlorosulfate which comprises treating anhydrous 1,1-dichloroethane with sulfur trioxide at a temperature in the range of about minus 20 to about 20° C.

10. A rubber product made by compounding a conjugated diene-vinyl pyridine rubbery copolymer with an alkene sulfuric acid having not more than 20 carbons in the alkene and heating the compounded material.

11. A method of improving the properties of a conjugated diene-vinyl pyridine rubbery copolymer which comprises adding an alkene sulfuric acid having not more than 20 carbons in the alkene to said copolymer and heating the admixed copolymer and acid.

12. A method for the preparation of ethylene sulfuric acid which comprises treating alpha-chloroethane chlorosulfate with water and recovering said acid from the mass thus obtained by extraction with ether.

13. A method for the preparation and recovery of ethylene sulfuric acid which comprises at a temperature maintained below about 30° F. adding slowly with stirring sulfur trioxide to ethylidene chloride, upon substantial completion of the reaction thus brought about admixing the reaction mass thus obtained with water maintained substantially at the melting temperature of ice, causing hydrolysis of the reaction mass to form an oil layer and a supernatant aqueous layer, separating the oil there from the aqueous layer and washing said oil layer with ice water until it is substantially free of sulfate ion, then dissolving said oil layer in cold ether, admixing the ether solution thus obtained with approximately an equal volume of distilled water, and gradually allowing its temperature to rise causing hydrolysis of the oil layer from ethylene sulfuric acid, recovering said acid in the water phase as said acid is formed, and extracting said acid from said water phase with ether to obtain an ether extract containing ethylene sulfuric acid from which said acid can be recovered by distilling away the ether.

14. A method for the preparation of an improved conjugated diene-vinyl pyridine copolymer which comprises preparing an alkene sulfuric acid, having the formula

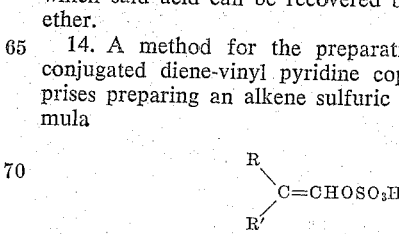

wherein R and R' are selected from hydrogen and an alkyl group and wherein the carbon atoms in R and R' total not more than twenty; in which an alpha-chloroalkyl chlorosulfate, having the formula

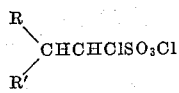

wherein R and R' are as before stated herein; is treated with water to form said acid, compounding said acid with a conjugated diene-vinyl pyridine copolymer, and then heating the compounded material.

15. A rubber product made by compounding a butadiene-vinyl pyridine rubber with ethylene sulfuric acid and heating the compounded material.

16. A method of improving the properties of a butadiene-vinyl pyridine rubber which comprises admixing therewith ethylene sulfuric acid and heating the admixed rubber and acid.

References Cited in the file of this patent

UNITED STATES PATENTS

| | | |
|---|---|---|
| 2,395,347 | Sharkey | Feb. 19, 1946 |
| 2,559,751 | Berry et al. | July 10, 1951 |
| 2,580,857 | Smith | Jan. 1, 1952 |
| 2,582,670 | Beaver | Jan. 15, 1952 |
| 2,641,594 | Barney | June 9, 1953 |
| 2,647,913 | Kosmin | Aug. 4, 1953 |
| 2,667,469 | Sauer | Jan. 26, 1954 |

OTHER REFERENCES

Cahours: Annalen der Chemie und Pharmacie, 102, pp. 285–293 (1857).